US012798209B2

(12) United States Patent
Vulp et al.

(10) Patent No.: US 12,798,209 B2
(45) Date of Patent: Nov. 17, 2026

(54) METHOD FOR ASSESSING THE STATE OF PRESSING PUNCHES OF A ROTARY PRESS AND ASSOCIATED DEVICE

(71) Applicant: Fette Compacting GmbH, Schwarzenbek (DE)

(72) Inventors: Sven Vulp, Klein Pampau (DE); Janis Herrmann, Wismar (DE); Ina Petry, Hamburg (DE); Andreas Teetzen, Schwarzenbek (DE); Jochen Gäth, Schwanheide (DE)

(73) Assignee: Fette Compacting GmbH, Schwarzenbek (DE)

( * ) Notice: Subject to any disclaimer, the term of this patent is extended or adjusted under 35 U.S.C. 154(b) by 166 days.

(21) Appl. No.: 18/511,260

(22) Filed: Nov. 16, 2023

(65) Prior Publication Data

US 2024/0173934 A1 May 30, 2024

(30) Foreign Application Priority Data

Nov. 29, 2022 (DE) ..................... 10 2022 131 493.6

(51) Int. Cl.
*B30B 15/00* (2006.01)
*B30B 11/00* (2006.01)
*B30B 11/08* (2006.01)

(52) U.S. Cl.
CPC ........ *B30B 15/0094* (2013.01); *B30B 11/005* (2013.01); *B30B 11/08* (2013.01)

(58) Field of Classification Search
CPC ... B30B 15/0094; B30B 15/302; B30B 15/14; B30B 11/08
See application file for complete search history.

(56) References Cited

U.S. PATENT DOCUMENTS 3,891,375 A * 6/1975 Pilewski ............. B30B 15/0023 425/389
9,216,553 B2 * 12/2015 Hübner ................. B30B 11/006
(Continued)

FOREIGN PATENT DOCUMENTS

DE 19502596 A1 8/1996
DE 19502596 C2 8/1997
(Continued)

OTHER PUBLICATIONS

English Translation for WO 2021058516 (Year: 2021).*
European Patent Office; European Search Report; Application No. 23209164.5; Dated: Apr. 4, 2024; 7 pages.

*Primary Examiner* — Seyed Masoud Malekzadeh
(74) *Attorney, Agent, or Firm* — Barclay Damon LLP

(57) ABSTRACT

A method of manufacturing a rotary press that assesses a wear state of pressing punches includes structuring the rotor to comprise an upper punch guide for upper pressing punches, a lower punch guide for lower pressing punches, and a die plate defining a plurality of cavities. A filling apparatus is structured to deliver a powder material into the plurality of cavities. A pressure apparatus includes an upper pressure roller that interacts with the upper press punches and a lower pressure roller that interacts with the lower pressing punches. At least one pressing force sensor is structured to measure pressing force progressions during the pressing of the powder material. An evaluation apparatus is structured to perform a state analysis of the measured pressing force progressions and individually assesses the wear state of at least one of the upper pressing punches and the lower pressing punches based on the state analysis.

23 Claims, 2 Drawing Sheets

(56) References Cited

U.S. PATENT DOCUMENTS

| | | | | |
|---|---|---|---|---|
| 9,457,498 | B2 * | 10/2016 | Groth | B30B 15/007 |
| 9,664,582 | B2 * | 5/2017 | Schmidt | G01L 25/00 |
| 9,884,464 | B2 * | 2/2018 | Groth | B30B 11/02 |
| 9,996,073 | B2 * | 6/2018 | Lüdemann | B30B 15/028 |
| 10,500,807 | B2 * | 12/2019 | Klaer | B30B 11/08 |
| 11,511,506 | B2 * | 11/2022 | Brand | B30B 11/005 |
| 2007/0029691 | A1 * | 2/2007 | Nakamura | B30B 11/005<br>425/149 |
| 2010/0038808 | A1 * | 2/2010 | Vogeleer | B30B 11/005<br>425/148 |
| 2014/0144205 | A1 * | 5/2014 | Schmidt | G01L 25/00<br>73/1.08 |
| 2014/0178516 | A1 * | 6/2014 | Hubner | B30B 11/005<br>425/149 |
| 2015/0298416 | A1 * | 10/2015 | Groth | B30B 15/007<br>419/66 |
| 2015/0336302 | A1 * | 11/2015 | Groth | B30B 11/02<br>425/352 |
| 2016/0221217 | A1 * | 8/2016 | Lünstedt | B30B 1/186 |
| 2017/0050401 | A1 * | 2/2017 | Klaer | B30B 11/08 |
| 2019/0193362 | A1 * | 6/2019 | Brand | B30B 11/08 |

FOREIGN PATENT DOCUMENTS

| | | | | |
|---|---|---|---|---|
| DE | 19844390 | A1 | 4/2000 | |
| EP | 0879140 | B1 | 11/1999 | |
| EP | 3501811 | A1 | 6/2019 | |
| EP | 2 707 208 | B1 | 1/2022 | |
| JP | 2000-505729 | A | 5/2000 | |
| JP | 2000271793 | A | 10/2000 | |
| WO | WO-2021058516 | A1 * | 4/2021 | B30B 15/26 |

* cited by examiner

METHOD FOR ASSESSING THE STATE OF PRESSING PUNCHES OF A ROTARY PRESS AND ASSOCIATED DEVICE

CROSS REFERENCE TO RELATED INVENTION

This application is based upon and claims priority to, under relevant sections of 35 U.S.C. § 119, German Patent Application No. 10 2022 131 493.6, filed Nov. 29, 2022, the entire contents of which are hereby incorporated by reference.

TECHNOLOGICAL FIELD

The disclosed invention relates to a method for assessing the state of pressing punches of a rotary press, where the rotary press comprises a rotor that can be rotated by means of a rotary drive. The rotor comprises an upper punch guide for upper pressing punches and a lower punch guide for lower pressing punches as well as a die plate arranged between the punch guides. The pressing punches interact with cavities of the die plate and the rotary press further comprises a filling apparatus by means of which powder material to be pressed is filled into the cavities of the die plate. The rotary press includes a pressure apparatus having an upper pressure roller and a lower pressure roller which interact with the upper pressing punches and with the lower pressing punches during operation in order to press the powder material in the cavities of the die plate.

The invention also relates to a rotary press, comprising a rotor that can be rotated by means of a rotary drive. The rotor includes an upper punch guide for upper pressing punches and a lower punch guide for lower pressing punches as well as a die plate arranged between the punch guides. The pressing punches interact with cavities of the die plate and the rotary press further includes a filling apparatus by means of which powder material to be pressed is filled into the cavities of the die plate. The rotary press comprises a pressure apparatus having an upper pressure roller and a lower pressure roller which interact with the upper pressing punches and with the lower pressing punches during operation in order to press the powder material in the cavities of the die plate.

BACKGROUND

In rotary presses, a large number of upper and lower pressing punches are generally provided which are in each case assigned to one cavity of a die plate in pairs. During operation of the rotary press, the upper and lower pressing punches rotate together with the die plate, wherein their axial movement is controlled by means of control cams and is guided by means of upper and lower punch guides. During the course of the rotation, the die plate travels through various apparatuses of the rotary press, namely a filling apparatus, in which powder material to be pressed is filled into the cavities of the die plate, and a pressure apparatus, in which the upper and lower pressing punches are pushed into the cavities by means of upper and lower pressure rollers in order to press the powder material into pellets, for example tablets. After the pressure apparatus, the upper pressing punches are guided upward out of the cavities and the pellets produced in the cavities are pushed by the lower pressing punches onto the upper side of the die plate. By means of a scraper, for example, the pellets are then scraped off of the die plate into an output of the rotary press, from where they are supplied for further processing.

Rotary presses are operated at high rotor speeds and correspondingly high production speeds. During the large number of pressing processes, the pressing punches become worn. In particular, the interaction between the punch heads and the pressure rollers can result in flattening of the punch heads in the region of the mirror surface thereof. This has an impact on the functional length of the pressing punches, which in turn has an impact on the production process and thus on the quality of the pellets.

The state of the pressing punches is usually evaluated by means of visual inspection. However, this assessment method of the state of the pressing punches is imprecise and depends on the operator assessing the pressing punches. It is difficult to define suitable objective criteria for assessing the state of the pressing punches and, if applicable, for replacing them. Manual inspection methods are associated with a significant time investment. In practice, an unsatisfactory state of the pressing punches, for example due to increased wear, is often only noticed when production problems occur or when the quality of the pellets produced is unsatisfactory. It has also already been proposed to draw conclusions on the state of the pressing punches from the pressing force of the pressing punches. For this purpose, the pressing force can be measured by means of load cells arranged at the pressure apparatus. A state analysis of all pressing punches in real time has thus not been possible so far.

WO 2021/058516 A1 proposes a pressing force measurement using measuring apparatuses integrated in the respective pressing punches, wherein the measuring apparatuses are intended to be able to function in an energetically autonomous manner. This is intended to make it possible to continuously record physical or chemical properties throughout the entire rotor rotation of a rotary press, since the measuring apparatuses are not arranged in a stationary manner at one location of the rotary press on account of being integrated in the rotating pressing punches. The arrangement described as disadvantageous in WO 2021/058516 A1 is also intended to be avoided in this way, in which arrangement the pressing force is measured at pressure rollers of the pressure apparatus, meaning that further components are present between the sensor and pressing punch. WO 2021/058516 A1 explains that these intermediate components influence the quality of the force measurement due to differing strength and rigidity.

However, equipping each individual pressing punch with a measuring apparatus, as described in WO 2021/058516 A1, is associated with significant effort and high costs. Pressing punches of rotary presses are manufactured from metal, in particular stainless steel. This makes integration of a measuring apparatus into the pressing punches very cumbersome without undesired impairment of the stability of the pressing punch. At the same time, the signal transmission from the measuring apparatus to an apparatus receiving the measured values is significantly impaired on account of the material of the pressing punches.

Proceeding from the explained prior art, the object of the invention is therefore to provide a method and a rotary press of the type mentioned at the outset by means of which a state analysis of the pressing punches is possible for each pressing punch in a reliable manner and according to objective criteria, in particular in real time, with little design effort and low costs.

BRIEF SUMMARY OF THE INVENTION

An embodiment of a method of assessing the state of pressing punches of a rotary press includes the following steps:

(1) measuring the pressing force progressions at the upper and/or lower pressing punches by means of a pressing force sensor arranged at the pressure apparatus during pressing of the powder material; and (2) performing a state analysis of the measured pressing force progressions by an evaluation apparatus and individually assessing the state of the upper and/or lower pressing punches based on the state analysis.

An embodiment of a rotary press includes a pressing force sensor arranged at the pressure apparatus and configured for measuring the pressing force progressions at the upper and/or lower pressing punches during pressing of the powder material. The rotary press further includes an evaluation apparatus configured to perform a state analysis of the measured pressing force progressions and to individually assess the state of the upper and/or lower pressing punches based on the state analysis.

The basic configuration of the rotary press, as provided according to the present invention and/or as used in the method according to the invention, was explained at the outset. According to the invention, a pressing force sensor is arranged at the pressure apparatus. The pressing force sensor may, for example, be arranged at the upper and/or lower pressure roller of the pressure apparatus or, alternatively, at an upper and/or lower pre-pressure roller of a pre-pressure apparatus of the pressure apparatus, if present. In particular, the pressing force sensor can be arranged on a holder of the upper and/or lower pressure rollers or, alternatively, upper and/or lower pre-pressure rollers, in particular on a receiving portion of an adjusting mechanism of the (pre-)pressure rollers. The pressing force sensor may, for example, be configured as a load cell that experiences elastic deformation throughout the course of the pressing force, which in turn generates an electrical voltage value that is proportional to the pressing force and that can be evaluated as a measurement signal. By means of the at least one pressing force sensor, pressing force progressions are measured for the upper and/or lower pressing punches, in particular for all upper and/or all lower pressing punches, during pressing of the powder material, i.e. during contact of the pressing punches with the upper and/or lower pressure rollers or, alternatively, upper and/or lower pre-pressure rollers. The pressing force progression is therefore measured over time or travel distance. The result of the measurement is a pressing force curve over time or travel distance during the pressing process, in particular from when the pressing punches first make contact with the pressure rollers or, alternatively, pre-pressure rollers until such a time as said contact has ended. In the process, a high-frequency pressing force progression is measured and sent to an evaluation apparatus at a high frequency. The evaluation apparatus performs a state analysis of the measured pressing force progressions based on the received measurement results and individually assesses the state of the upper and/or lower pressing punches, in particular all upper and/or all lower pressing punches, based on the state analysis. The recorded pressing force progressions are thus analyzed individually by the evaluation apparatus during the state analysis and the state of the pressing punches respectively assigned to the analyzed pressing force progressions is individually assessed on this basis by the evaluation apparatus. The state of each pressing punch of the rotary press can be assessed, namely throughout the entire production duration of the rotary press. Therefore, the pressing force progressions of all upper pressing punches and/or all lower pressing punches are measured in particular repeatedly during the revolution of the rotor and the state of the pressing punches is analyzed and assessed continuously. The pressing force progressions, the transfer of the measured values to the evaluation apparatus and/or the state analysis as well as the assessment of the pressing punches can take place in real time by means of the evaluation apparatus. At the same time, uninterrupted assessment of the state of the pressing punches is made possible. The state assessment takes place in a reproducible manner based on objective assessment criteria that can be verified at any time. The assessment therefore does not depend on an operator. It can take place in a fully automatic manner. At the same time, the effort both in terms of design and cost involved in the state assessment can be significantly reduced with respect to the prior art explained at the outset with measuring apparatuses integrated in each case in the pressing punches. The signal quality of the pressing force sensors is reliably ensured at all times on account of the stationary arrangement at the pressure apparatus. The invention allows for precise prediction of the degree of wear of the pressing punches in real time. Implementation in existing systems is simple and can therefore be used for different products and rotary presses in a simple manner. Due to the precise assessment of the state of each individual pressing punch, quality features of the pellets produced are sustainably optimized. The process stability is increased and unplanned outages of the rotary press are minimized. At the same time, the pressing punches can be reliably used for longer, since their state is precisely known. Based on the evaluation of the state of all pressing punches and the clear identification of the assessed pressing punches, re-pairing, cleaning, or even replacement of pressing punches can be carried out in order to prevent a loss of quality of the pellets or an unplanned stop of the rotary press.

The measurement results of the pressing force sensor can be transferred to the evaluation apparatus via microcontrollers or high-frequency input terminals, for example. The evaluation apparatus can be integrated in the machine controller of the rotary press. However, the evaluation apparatus can also be arranged separately from the rotary press, for example within the same production space as the rotary space or at a location remote from the production space. For this purpose, it would also be possible to transmit the measurement data of the pressing force sensor to a cloud, from where said data can be supplied for further evaluation. The evaluation apparatus may also be integrated in the cloud. In particular, the evaluation apparatus may comprise software for performing the state analysis and for assessing the state of the pressing punches based on the state analysis.

According to one embodiment, the state analysis can comprise a comparison of the measured pressing force progressions with at least one reference pressing force progression. The at least one reference pressing force progression may be a historic pressing force progression that, for example, was recorded at the start of a production process or at an earlier point in time and that resulted in a good pellet quality. The reference pressing force progression can be stored in a database to which the evaluation apparatus has access for the assessment of the state of the relevant pressing punch. The evaluation apparatus determines a deviation of the respectively measured pressing force progression with respect to the reference pressing force progression, for example a deviation of defined criteria of the progression, as explained in more detail below. The evaluation apparatus can draw conclusions on the state of the relevant pressing punch based on the degree of the deviation. For example, a limit value for a reliable deviation of the measured pressing force progression from the reference pressing force progression can be stored in the evaluation apparatus. If the limit value is exceeded, the evaluation apparatus can assess the state of the relevant pressing punch, for example, as a pressing punch with increased wear. Wear can be caused both by material abrasion on the pressing punch and by products adhering to the pressing punch. The limit value can be determined manually or rather empirically. Individual limit values can be stored in the evaluation apparatus depending on the relevant type of installed pressing punch, the powder material pressed in the rotary press, and other properties of the rotary press.

According to another embodiment, the evaluation apparatus can take into account the width of the respectively measured pressing force progressions as a criterion for wear of the respectively assessed pressing punches within the scope of the state analysis. When reference is made in this regard to the respectively assessed pressing punch, this relates to the pressing punch for which the respectively recorded pressing force progression was measured. The width of the pressing force progression is the width of the recorded curve of the pressing force over time or travel distance. For example, an increase in the width of the pressing force progression, in particular in relation to a reference pressing force curve, may indicate increased wear of the pressing punch. For example, pressing punches with abraded punch heads, in particular abraded or enlarged mirror surfaces, exhibit an earlier rise of the pressing force curve because the mirror surface strikes the relevant pressure roller earlier.

According to another embodiment, the evaluation apparatus can take into account the magnitude of the maximum of the respectively measured pressing force progressions as a criterion for wear of the respectively assessed pressing punches within the scope of the state analysis. The maximum is in turn the maximum of the recorded curve of the pressing force over time. The pressing force curve may also have multiple maxima, for example if multiple punch heads are in contact with the same pressure roller at the same time. In this case, the value of one or both or all maxima can be taken into account. A change in the maximum of the pressing force progression, for example a lower maximum than in a reference pressing force progression, is also indicative of increased wear of the pressing punch, in particular an abraded punch head or a worn punch tip, and therefore the effective punch length is reduced and, as a result, the maximum pressing force during the pressing process is reduced while the side length of the pellets produced remains the same. The temporal position of a maximum or, if applicable, of multiple maxima can also be taken into account during the state analysis as a criterion for wear of the respectively assessed pressing punch. In particular, within the scope of the state analysis, the evaluation apparatus can take into account the presence of multiple maxima and/or the distance between multiple maxima of the respectively measured pressing force progressions as a criterion for wear of the respectively assessed pressing punches. The distance between the mirror surfaces of adjacent pressing punches may also vary depending on the degree of wear. This may, for example, lead to a changed distance between the maxima of directly successive pressing force progressions of directly successive pressing punches. In this respect, the position or rather the distance of the maxima of the pressing force progressions of two adjacent pressing punches can also be taken into account as a criterion for wear of the respectively assessed pressing punches.

According to another embodiment, the evaluation apparatus can take into account the point in time of the rise and/or fall of the respectively measured pressing force progressions as a criterion for wear of the respectively assessed pressing punches within the scope of the state analysis. The evaluation apparatus can also take into account the gradient of the rise and/or fall of the respectively measured pressing force progressions as a criterion for wear of the respectively assessed pressing punches within the scope of the state analysis. Steeper or flatter rises or falls of the pressing force progression as well as changed points in time at which the rise and/or fall begins within the pressing force progression suggest various wear characteristics, for example an enlarged mirror surface, a changed radius of the punch head due to wear, a shortened punch length, or an irregular, in particular rough, punch head surface.

When increased wear of an assessed pressing punch is detected, the evaluation apparatus can output a warning message. As already explained, a limit value for the deviation between the measured pressing force progression and the reference pressing force progression, above which increased wear is detected, can for example be defined when comparing the measured pressing force progressions with at least one reference pressing force progression. The evaluation apparatus can comprise a display apparatus for outputting a warning message. It is also conceivable to output the warning on a separate device, for example a computer, tablet, or smartphone. For example, an operator can then take additional steps, for example examine the worn punch or punches and replace same, if necessary.

The warning message may comprise a suggestion for cleaning and/or re-treating the pressing punch with increased wear and/or for replacing the pressing punch with increased wear with a new pressing punch and/or for replacing the entire set of upper and/or lower pressing punches of the rotary press with a set of new upper and/or lower pressing punches. The entire set of upper and/or lower pressing punches comprises all upper and/or lower pressing punches installed during operation of the rotary press. It would therefore be possible, for example, for the warning message to comprise a suggestion for replacing all upper pressing punches if wear has been detected on one or more upper pressing punches and/or for the warning message to comprise a suggestion for replacing all lower pressing punches if wear has been detected on one or more lower pressing punches. It would also be possible for the warning message to comprise a suggestion for replacing all upper and lower pressing punches if wear has been detected on one or more upper pressing punches or one or more lower pressing punches. The warning message may also comprise a suggestion for swapping the pressing punch with increased wear with another pressing punch of the rotary press, i.e. a new pairing for the pressing punch with increased wear. This makes it possible, for example, to prevent unfavorable pressing punch pairings. Criteria for the different recommendations for action may for example be differences in the pressing force curve with regard to further parameters of the rotary press, for example quality parameters of the produced pellets, an average value of the determined pressing force, a side length of the produced pellets, or a relative standard deviation of such parameters.

According to another embodiment, the state analysis may comprise a multivariate data analysis. Multivariate data analyses make it possible to examine and assess multiple parameters of the pressing force progression at the same time. In particular, based on the pressing force progressions, the information required for the state, to be assessed, of the pressing punches can be distinguished from information that is not relevant thereto. An example of information that is irrelevant but that has an influence on the pressing force progression is the side length of the produced pellets, i.e. the height of the manufactured tablets. The amount of powder material to be pressed and located in the cavities naturally has an influence on the pressing force curve, for example the magnitude of the maximum of the pressing force curve. The use of multivariate data analyses makes it possible to simplify and thus expedite the assessment of the state, in that only the pressing force progression information that is relevant for assessing the state of the pressing punches is identified and used.

According to a particularly practical embodiment, the multivariate data analysis can comprise a principal component analysis. Principal component analyses (PCA) can be used to identify, in a particularly reliable manner, the data of the measured pressing force progressions relevant for the issue at hand, in this case the assessment of the state of the pressing punches, and the separation of said data from the pressing force progression information that is not relevant for assessing the state of the pressing punches. According to another embodiment, within the scope of the principal component analysis, at least one principal component that exhibits the greatest variance with respect to the wear of the upper and/or lower pressing punches can be identified for a large number of pressing force progressions. The principal component(s) with the greatest variance contain the greatest amount of information on the state of the pressing punches and are thus particularly meaningful with regard to the issue at hand. By restricting the information relating to the pressing force progressions to the at least one principal component, for example two or three principal components, the state of the pressing punches, for example the wear of the pressing punch, and even individual parts of the pressing punch, for example the punch head or punch tip, can still be assessed in a reliable manner when the dataset and thus the evaluation have been drastically simplified.

The multivariate data analysis can also comprise a multivariate regression method, for example a partial least square regression (PLS/PLSR) method, in order to be able to form models for predicting the state of the pressing punches.

In an embodiment, the evaluation apparatus can assess the state of the mirror surface and/or the state of the punch tip of the respectively assessed pressing punches and/or the pressing force exerted by the respectively assessed pressing punches on the basis of the state analysis, in particular on the basis of multivariate data analysis methods explained here. The mirror surface is known to be the generally planar surface on the upper side of the punch head of the pressing punches and the punch tip is the portion which is formed on the opposite lower side of the pressing punches and which plunges into the cavities of the die plate.

According to another embodiment, the evaluation apparatus can perform data preprocessing of the measured pressing force progressions prior to the state analysis, in particular normalization, smoothing, and/or a derivation of the first or higher order. This can improve and simplify the subsequent data processing within the scope of the state analysis.

The state analysis can be performed by means of machine learning algorithms. In particular, a self-learning algorithm can be stored in the evaluation apparatus and continuously optimizes the criteria for the assessment of the state of the pressing punches by the evaluation apparatus based on training data and/or empirical data from production. Limit values for a deviation of measured pressing force progressions from a reference pressing force progression can also be optimized during operation by means of self-learning software of this kind based on training data or empirical data. The machine learning algorithms may, for example, comprise neural networks.

According to another embodiment, the evaluation apparatus can display results of the state analysis or assessment of the pressing punches to an operator. The evaluation apparatus can also comprise an input apparatus via which an operator can set parameters for the state analysis. In this way, a user of the rotary press can, for example, input or adapt limit values for a deviation of measured pressing force progressions from at least one reference pressing force progression. The display and input can take place, for example, directly at the evaluation apparatus. However, display and/or input via a corresponding application, for example a web application, for example via a computer, tablet, or smartphone, is also conceivable.

According to another embodiment, it can be provided that a pressing force sensor is arranged at the upper pressure roller and a pressing force sensor is arranged at the lower pressure roller of the pressure apparatus, and that the pressing force progressions at the upper and lower pressing punches are measured as they pass through the upper and lower pressure rollers. Furthermore, it can be provided that the pressure apparatus further comprises a pre-pressure apparatus having an upper pre-pressure roller and a lower pre-pressure roller, wherein a pressing force sensor is arranged at the upper pre-pressure roller and a pressing force sensor is arranged at the lower pre-pressure roller of the pressure apparatus, and that the pressing force progressions at the upper and lower pressing punches are measured as they pass through the upper and lower pre-pressure rollers. As explained at the outset, the pressing force sensor(s) can, in particular, be arranged on a holder of the pressure rollers or, alternatively, pre-pressure rollers. By virtue of the above-mentioned embodiments, particularly comprehensive recording of the pressing force progressions and thus assessment of the pressing punches is possible.

The rotary press, in particular the evaluation apparatus, can be designed to carry out the method according to the invention. Accordingly, the method according to the invention can be carried out using the rotary press according to the invention.

BRIEF DESCRIPTION OF THE DRAWINGS

An exemplary embodiment of the invention is explained in greater detail below with reference to the figures FIG. 1 schematically illustrates an embodiment of a rotary press according to the invention showing an unrolled representation of the rotor.

The same reference signs refer to the same objects in the figures unless indicated otherwise.

DETAILED DESCRIPTION OF THE INVENTION

Figure 1:
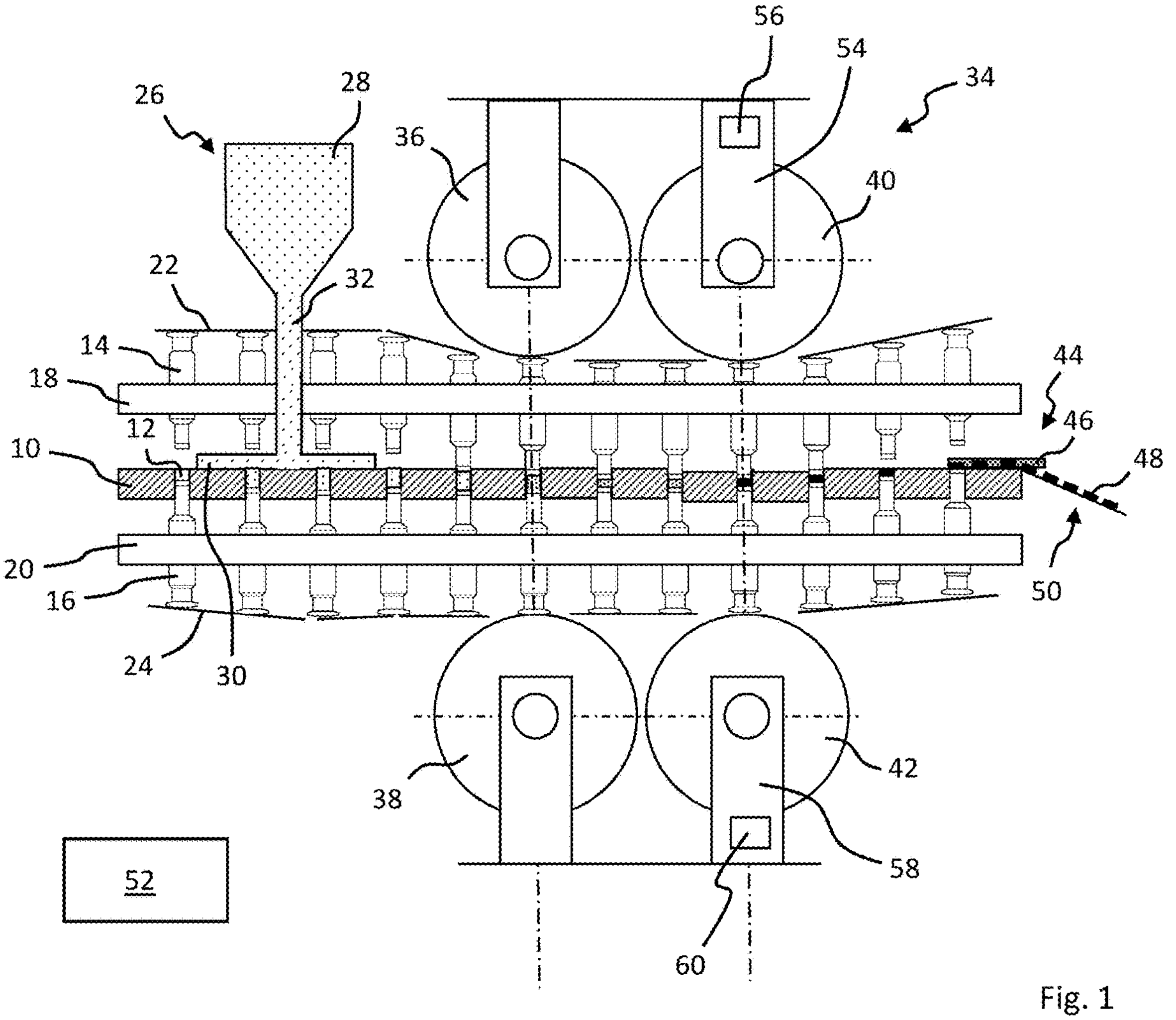

The rotary press shown in FIG. 1 is a rotary press for producing tablets, in which powdered material is pressed into tablets. The rotary press comprises a rotor rotatingly driven by a rotary drive with a die plate 10 having multiple cavities 12. The cavities 12 can be formed, for example, by bores in the die plate 10. The rotor further comprises multiple upper pressing punches 14 and lower pressing punches 16 which revolve synchronously with the die plate 10. The upper pressing punches 14 are axially guided in an upper punch guide 18 and the lower pressing punches 16 are axially guided in a lower punch guide 20. The axial movement of the upper pressing punches 14 and lower pressing punches 16 in the course of the rotation of the rotor is controlled by upper control cam elements 22 and lower control cam elements 24. The rotary press further comprises a filling apparatus 26, which comprises a filling reservoir 28 and a filling chamber 30 which are connected via a filling pipe 32. In this manner, in the present example, powder material arrives from the filling reservoir 28 via the filling tube 32 into the filling chamber 30 due to gravity and from there via a filling opening provided on the lower side of the filling chamber 30 into the cavities 12 of the die plate 10.

The rotary press further comprises a pressure apparatus 34. The pressure apparatus 34 comprises a pre-pressure apparatus having an upper pre-pressure roller 36 and a lower pre-pressure roller 38 as well as a main pressure apparatus having an upper pressure roller 40 and a lower pressure roller 42. Furthermore, the rotary press comprises an ejector apparatus 44 and a scraper apparatus 46 having a scraper element which supplies the tablets 48 produced in the rotary press to a discharge apparatus 50 for discharging from the rotary press. The scraper apparatus 46 may, for example, comprise a preferably crescent-shaped scraper element which scrapes tablets 48 conveyed by the lower pressing punches 16 onto the upper side of the die plate 10 in the region of the ejector apparatus 44 off of the die plate 10 and supplies them to the discharge apparatus 50.

The rotary press further comprises an evaluation apparatus 52 for controlling the operation of the rotary press and for carrying out the method according to the invention, as explained in greater detail below.

An upper pressing force sensor 56 is arranged on a holder 54 of the upper pressure roller 40. A lower pressing force sensor 60 is arranged on a holder 58 of the lower pressure roller 42. It should be noted that it is also possible to arrange only one pressing force sensor in the region of the upper pressure roller 40 or in the region of the lower pressure roller 42. Additionally or alternatively, corresponding pressing force sensors can also be arranged in the region of the upper pre-pressure roller 36 and/or lower pre-pressure roller 38. The lower and upper pressing force sensors 56, 60 may, for example, be load cells which are elastically deformed during the pressing of powder material, wherein the elastic deformation outputs an electrical voltage value that is proportional to the pressing force. The measured values of the upper and lower pressing force sensors 56, 60 are applied to the evaluation apparatus 52. In the present case, a pressing force progression is measured by means of the upper and lower pressing force sensors 56, 60 for each of the upper and lower pressing punches 14, 16 during pressing of the powder material in the cavities 12 of the die plate 10, in particular from the start to the end of contact of the punch heads of the pressing punches 14, 16 with the upper and lower pressure roller 40, 42, respectively.

The evaluation apparatus 52 performs a state analysis of the measured pressing force progressions and individually assesses the state of the upper and lower pressing punches 14, 16 based on the state analysis. This is explained in greater detail below based on an example.

Figure 2:
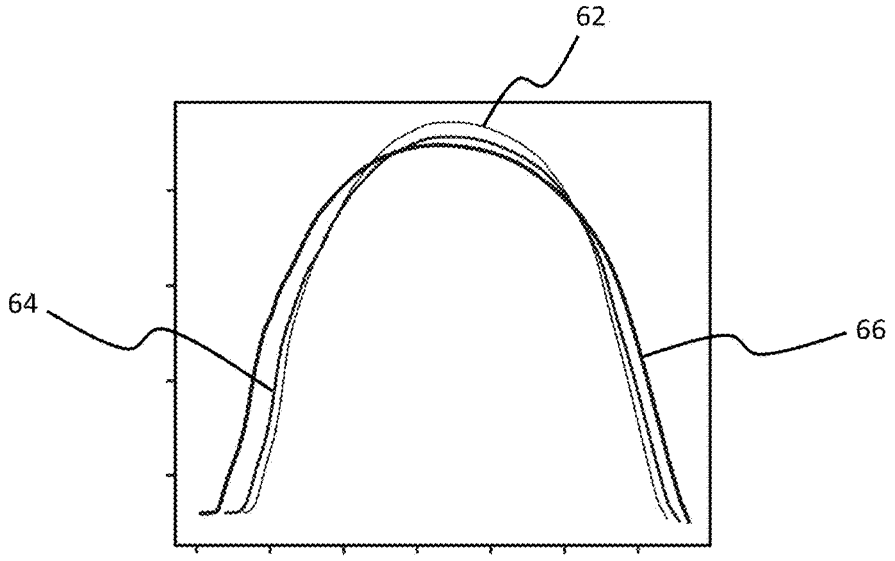
FIG. 2 graphically illustrates an example of pressing force progressions recorded using the rotary press according to the invention during pressing of powder material.

FIG. 2 shows various pressing force progressions recorded, for example, by the upper pressing force sensor 56 at the upper pressing punches 14 over time. Here, the pressing force is plotted for three progressions against time. The first pressing force progression 62 was recorded using non-worn, in particular new upper and lower pressing punches 14, 16. A further pressing force progression 64 was recorded while a pair of upper and lower pressing punches 14, 16 were passing through the upper and lower pressure rollers 40, 42, wherein, in the example shown, the upper pressing punch 14 exhibited increased wear, in particular an abraded mirror surface of the punch head. The third pressing force progression 66 in FIG. 2 was recorded for a pair of upper and lower pressing punches 14, 16 as they passed through the pressure rollers 40, 42, wherein, in the case of this punch pair, both the upper pressing punch 14 and the lower pressing punch 16 exhibited increased wear, in particular an abraded mirror surface of the punch head.

A comparison of the pressing force progressions 62, 64, 66 shows that, with increasing wear of the pressing punches 14, 16, the magnitude of the maximum of the pressing force progression becomes smaller and, at the same time, the width of the pressing force progression increases. In particular, the pressing force progression rises earlier and falls later the greater the extent to which the pressing punches 14, 16 are worn. The reason for this is that, in the case of abraded punch heads for example, the mirror surface makes contact with the relevant pressure roller at an earlier point in time and accordingly loses contact with the relevant pressure roller at a later point in time. At the same time, the effective length of the relevant pressing punch 14, 16 is shortened, for example, on account of a worn punch head, and therefore the maximum value of the pressing force, i.e. the maximum of the pressing force curves, decreases while the side length stays the same. The pressing force progressions 62, 64, 66 shown in FIG. 2 are merely examples. Depending on the wear feature of the pressing punches 14, 16, further effects may occur which lead to a deviation of the measured pressing force progression from the pressing force progression of a new pressing punch 14, 16. For example, the presence of multiple maxima in the pressing force progression or a steeper or flatter rise and/or fall of the pressing force progression can indicate further wear features, for example a changed radius of the punch head, an irregular punch head surface, a changed mirror surface shape, or a shortened effective length of the relevant pressing punch 14, 16.

According to a first embodiment, the evaluation apparatus 52 is configured to compare the recorded pressing force progressions 62, 64, 66 with a reference pressing force progression. In the present case, the pressing force progression 62 of FIG. 2, which was recorded for a new and thus non-worn punch pair, could for example be recorded as the reference pressing force progression. Limit values for particular deviation features of the recorded pressing force 64, 66 from the reference pressing force progression 62 can then, for example, be stored in the evaluation apparatus 52. For example, a limit value can be defined for a permissible widening of the pressing force progressions 64, 66 relative to the reference pressing force progression 62 and/or a limit value can be defined for a permissible reduction of the maximum of the pressing force progressions 64, 66 relative to the reference pressing force progression 62. Said limit values can be entered by an operator, for example based on empirical values. The limit values can be stored individually for the relevant rotary press, the punches in use, and the tablets to be pressed, in particular the powder material and, for example, the side length. It is also possible for software to be stored in the evaluation apparatus 52 which uses machine learning algorithms, for example comprising neural networks, to continuously check and optimize the stored limit values.

If one of the limit values is exceeded, the evaluation apparatus 52 can, for example, output a warning message, for example on a display apparatus or via software on a computer, tablet, or smartphone, for example. The warning message may, for example, display increased wear of particular pressing punches 14, 16 and give recommendations for action, for example for replacing worn pressing punches 14, 16 or the entire set of upper and/or lower pressing punches 14, 16. Recommendations for action for cleaning or re-treating the worn pressing punches 14, 16 are also conceivable, as are recommendations for swapping pressing punches 14, 16 of the rotary press among themselves, i.e. finding new pairings for upper pressing punches 14 and lower pressing punches 16 in order to prevent unfavorable pairings, for example.

Figure 3:
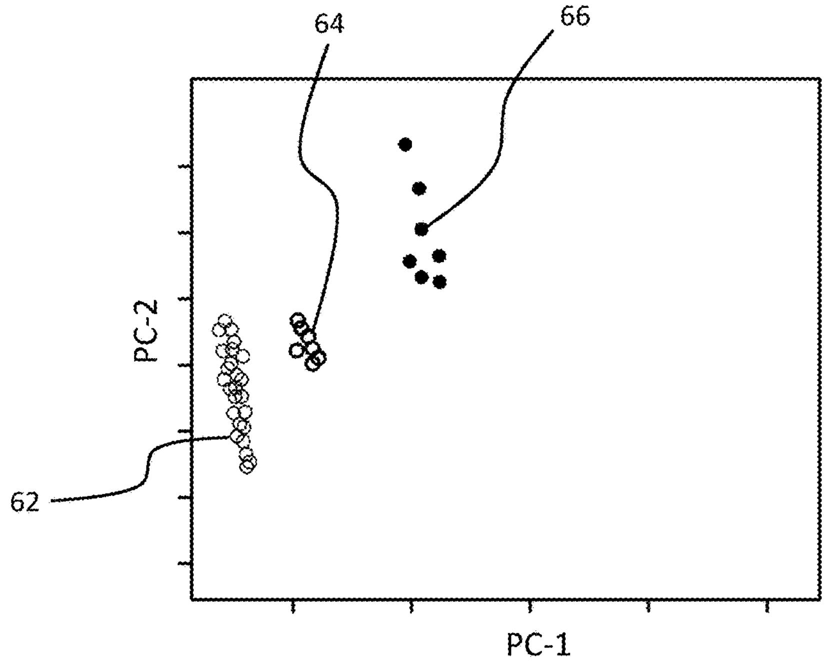
FIG. 3 graphically illustrates point values for two principal components determined according to the invention.

Another possibility for evaluating the recorded pressing force progressions 62, 64, 66 shall be explained based on FIG. 3. In this case, the evaluation apparatus 52 performs a multivariate data analysis, in particular comprising a principal component analysis. The aim of the principal component analysis is to identify, for a large number of recorded pressing force progressions 62, 64, 66, principal components that exhibit significant variance with regard to the wear of the pressing punches 14, 16, i.e. offer a good distinction with regard to criteria that are decisive for wear.

FIG. 3 is a so-called scores plot for graphically representing the pressing force curves 62, 64, 66 shown in FIG. 2 in the space of two principal components PC-1 and PC-2 determined in the course of the principal component analysis. The pressing force progressions 62, 64, 66 are shown as points, wherein in each case multiple measurements of the corresponding punch pairs, for example in the course of a multiple revolution of the rotor of the rotary press, are taken as a basis, such that in each case multiple points are represented in accordance with the pressing force progressions 62, 64, 66. The representation in a scores plot of this kind is such that two points are more similar the more densely they are arranged along an axis.

FIG. 3 clearly shows that the pressing force progression groups 62 for non-worn, new upper and lower pressing punches 14, 16, the pressing force progression points 64 for pairs of upper and lower pressing punches 14, 16 in which the upper pressing punch 14 exhibits increased wear, and the pressing force progression points 66 for punch pairs in which both the upper and the lower pressing punch 14, 16 exhibit increased wear differ significantly, in particular in the principal component PC-1. However, in the principal component PC-2, such a differentiation is not possible.

In the present case, it can therefore be concluded that the principal component PC-1 describes differences with regard to the state of wear of the pressing punch 14, 16, in particular the punch head, and in the example shown makes up 60.17% of the total variance of the samples. The principal component PC-2 thus describes other differences between the pressing force progressions 62, 64, 66 that cannot be directly assigned to the state of wear of the pressing punches 14, 16. For example, the principal component PC-2 may describe differently set side lengths of the tablets produced. Thus the multivariate data analysis is very useful for evaluating the pressing force progressions 62, 64, 66, for example in order to assess the state of wear of the pressing punches 14, 16, in particular their punch heads. The evaluation apparatus 52 can thus also use this to assess the state of the pressing punches 14, 16.

Figure 4:
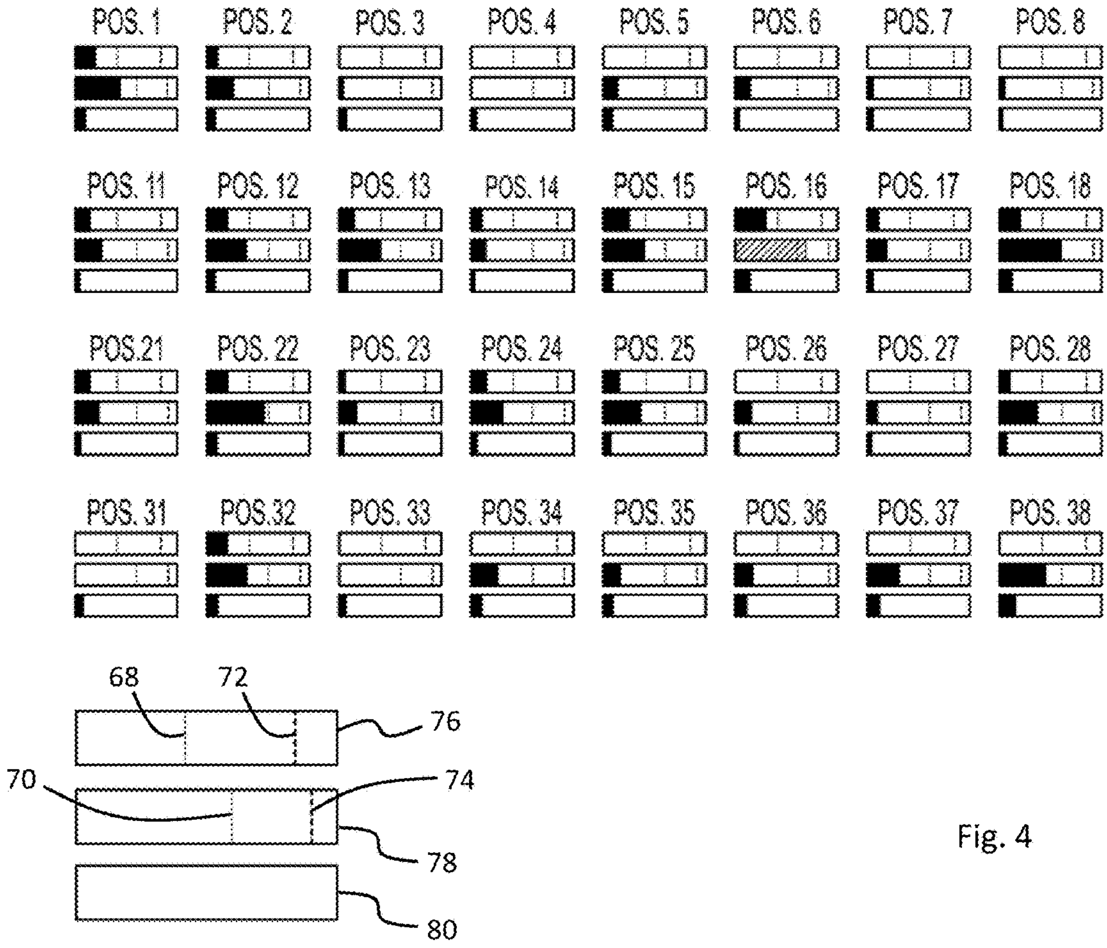
FIG. 4 schematically shows the state, assessed according to the invention, of the pressing punches of the rotary press.

FIG. 4 shows an example of a possible display of the state of upper pressing punch assessed in each case by means of the evaluation apparatus 52, wherein, in the example shown, 38 upper pressing punches 14 of the rotary press are assessed and displayed. For each punch position, the assessment of the state of different parameters of the upper pressing punches 14 is displayed. The three bars for a respective punch position are shown enlarged in the bottom left in FIG. 4 for illustrative purposes. The upper bar 76 in each case shows the state of wear of the punch head, in particular the mirror surface. The central bar 78 in each case shows a deviation of the measured maximum pressing force from a target value and the lower bar 80 in each case shows a different geometrical deviation of the pressing punch 14, for example a reduced effective length. These different assessment parameters can be determined, for example, based on a comparison of the recorded pressing force progressions 64, 66 with the reference pressing force progression 62. An assessment is accordingly also possible using the principal component analysis, as explained above.

In the example shown, a first limit value 68 and 70 and a second limit value 72 and 74 drawn in for the upper bars 76 and the central bars 78, respectively, as shown clearly in the enlarged representation of the bars 76, 78. If the relevant state of wear reaches the first limit value 68 or 70, a first warning is output by the evaluation apparatus 52. In the example shown, this is the case for the upper pressing punch 14 at position 16 in the central bar 78. When the second limit value 72, 74 is reached, a request is output by the evaluation apparatus 52 to replace the relevant pressing punch 14 or to replace the entire set of upper and/or lower pressing punches 14, 16. With regard to the geometrical deviation assessed in each case in the lower bar 80, a corresponding warning message is output by the evaluation apparatus 52 as soon as the end of the bar is reached in each case.

The representation of FIG. 4 can, for example, be displayed to an operator in a display apparatus of the evaluation apparatus 52 or via a corresponding application on a computer, tablet, or smartphone. This can be continuously updated during operation of the rotary press, such that the operator has an overview of the state of wear of the pressing punches 14, 16 at all times and can react accordingly.

LIST OF REFERENCE SIGNS

10 Die plate
12 Cavities
14 Upper pressing punches
16 Lower pressing punches
18 Upper punch guide
20 Lower punch guide
22 Upper control cam elements
24 Lower control cam elements
26 Filling apparatus
28 Filling reservoir
30 Filling chamber
32 Filling tube
34 Pressing apparatus
36 Upper pre-pressure roller
38 Lower pre-pressure roller
40 Upper pressure roller
42 Lower pressure roller
44 Ejector apparatus
46 Scraper apparatus
48 Tablets
50 Discharge apparatus
52 Evaluation apparatus

54 Holder
56 Upper pressing force sensor
58 Holder
60 Lower pressing force sensor
62 First pressing force progression
64 Second pressing force progression
66 Third pressing force progression
68 First limit value
70 First limit value
72 Second limit value
74 Second limit value
76 Upper bar
78 Central bar
80 Lower bar

The invention claimed is:

1. A method of manufacturing a rotary press configured to assess a wear state of pressing punches of the rotary press, the method comprising:

structuring a rotor configured to be rotated by a rotary drive, structuring the rotor to comprise, an upper punch guide for upper pressing punches, a lower punch guide for lower pressing punches, and a die plate arranged between the upper and lower punch guides and defining a plurality of cavities, wherein the upper pressing punches and the lower press punches are structured to interact with the plurality of cavities of the die plate;

structuring a filling apparatus to deliver a powder material into the plurality of cavities of the die plate;

structuring a pressure apparatus to include an upper pressure roller configured to interact with the upper press punches and a lower pressure roller configured to interact with the lower pressing punches during operation in order to press the powder material in the cavities of the die plate;

structuring at least one pressing force sensor to be positioned at the pressure apparatus and configured to individually measure pressing force progressions of at least one of the upper pressing punches and the lower pressing punches during the pressing of the powder material; and structuring an evaluation apparatus to perform an individual state analysis of the measured pressing force progressions, and based on the individual state analysis, individually assesses the wear state of the at least one of the upper pressing punches and the lower pressing punches respectively assigned to the analyzed pressing force progressions.

2. The method according to claim 1, wherein the performing the state analysis comprises comparing the measured pressing force progressions with at least one reference pressing force progression.

3. The method according to claim 1, wherein the performing the state analysis comprises determining a width of the measured pressing force progressions.

4. The method according to claim 1, wherein the performing the state analysis comprises determining a magnitude of a maximum of the measured pressing force progressions.

5. The method according to claim 1, wherein the performing the state analysis comprises determining at least one of; (i) multiple maxima of the measured pressing force progressions; and (ii) a distance between multiple maxima of the measured pressing force progressions.

6. The method according to claim 1, wherein the performing the state analysis comprises determining a time point for at least one of: (i) a rise of the measured pressing force progressions; and (ii) a fall of the measured pressing force progressions.

7. The method according to claim 6, wherein the performing the state analysis comprises determining a gradient of at least one of: (i) the rise of the measured pressing force progressions; and (ii) the fall of the measured pressing force progressions.

8. The method according to claim 3, further comprising structuring the evaluation apparatus to output a warning message when an increased wear of an assessed pressing punch is detected.

9. The method according to claim 8, wherein the warning message comprises at least one of: a suggestion for cleaning the assessed pressing punch;

re-treating the assessed pressing punch;

replacing the assessed pressing punch with a new pressing punch;

replacing the upper pressing punches; and replacing the lower pressing punches.

10. The method according to claim 8, wherein the warning message comprises a suggestion for swapping the assessed pressing punch with increased wear with another pressing punch of the rotary press.

11. The method according to claim 1, wherein the performing the state analysis comprises a multivariate data analysis.

12. The method according to claim 11, wherein the multivariate data analysis comprises a principal component analysis.

13. The method according to claim 12, further comprising determining at least one principal component that exhibits a greatest variance with respect to the wear of the at least one of the upper pressing punches and the lower pressing punches is identified for a larger number of the pressing force progressions.

14. The method according to claim 11, wherein the multivariate data analysis comprises a multivariate regression method.

15. The method according to claim 8, further comprising structuring the evaluation apparatus to assesses, using the state analysis, of at least one of:

a state of a mirror surface;

a state of a punch tip of the assessed pressing punch; and a pressing force exerted by the assessed pressing punch.

16. The method according to claim 1, further comprising structuring the evaluation apparatus to performs a data preprocessing of the measured pressing force progressions prior to the performing the state analysis.

17. The method according to claim 1, further comprising structuring the evaluation apparatus to perform the state analysis using machine learning algorithms.

18. The method according to claim 1, further comprising structuring the evaluation apparatus to display results of the state analysis to an operator.

19. The method according to claim 18, further comprising structuring the evaluation apparatus to comprises an input apparatus configured to enable an operator to set parameters for the state analysis.

20. The method according to claim 1, further comprising positioning the at least one pressing force sensor at the upper pressure roller.

21. The method according to claim 1, further comprising positioning the at least one pressing force sensor at the lower pressure roller.

22. The method according to claim 1, further comprising the measuring the pressing force progressions as the at least one of the upper pressing punches and the lower pressing punches pass through at least one of the upper pressure roller and the lower pressure roller.

23. The method according to claim 1, further comprising:

structuring the pressure apparatus to further comprise a pre-pressure apparatus comprising an upper pre-pressure roller and a lower pre-pressure roller;

arranging a pressing force sensor at the upper pre-pressure roller and arranging a pressing force sensor at the lower pre-pressure roller of the pressure apparatus; and measuring the pressing force progressions at the upper and lower pressing punches as the upper pressing punches pass through the upper pre-pressure roller and the lower pressing punches pass through the lower pre-pressure roller.

* * * * *